United States Patent
Bogeby et al.

(10) Patent No.: US 8,706,752 B2
(45) Date of Patent: Apr. 22, 2014

(54) METHOD AND APPARATUS FOR DETERMINING A LIST OF MEMBERS FOR A PUSH TO TALK COMMUNICATIONS SERVICE

(75) Inventors: Hans Bogeby, Huddinge (SE); Bert Skedinger, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 171 days.

(21) Appl. No.: 12/746,720

(22) PCT Filed: Dec. 7, 2007

(86) PCT No.: PCT/EP2007/063505
§ 371 (c)(1),
(2), (4) Date: Jul. 7, 2010

(87) PCT Pub. No.: WO2009/071129
PCT Pub. Date: Jun. 11, 2009

(65) Prior Publication Data
US 2010/0274800 A1    Oct. 28, 2010

(51) Int. Cl.
*G06F 17/30* (2006.01)
(52) U.S. Cl.
USPC .......................................................... 707/769
(58) Field of Classification Search
USPC ................... 707/759, 769; 455/518, 519, 521
See application file for complete search history.

(56) References Cited

U.S. PATENT DOCUMENTS

| | | | |
|---|---|---|---|
| 2003/0065774 A1* | 4/2003 | Steiner et al. | 709/225 |
| 2004/0015547 A1* | 1/2004 | Griffin et al. | 709/204 |
| 2005/0114306 A1* | 5/2005 | Shu et al. | 707/3 |
| 2005/0233776 A1* | 10/2005 | Allen et al. | 455/567 |
| 2007/0043730 A1* | 2/2007 | Wisely | 707/10 |
| 2007/0124294 A1* | 5/2007 | Sun et al. | 707/3 |
| 2008/0046482 A1* | 2/2008 | Oh et al. | 707/203 |
| 2008/0056234 A1* | 3/2008 | Sprague | 370/352 |

OTHER PUBLICATIONS

Skedinger B: "Appendix to OMA-POC-POCV2.1-2007-0013R01-INP—Dynamic_PoC_Groups" OMA Contribution, [Online] Nov. 30, 2007, pp. 1-12, XP002510539 Retrieved from the Internet: URL:http://member.openmobilealliance.org/ftp/Public_documents:POC/POCv2_1/2007/0MA-POC-POCV2_1-2007-0013R01-INP_Dynamic_PoC_Groups.zip> [retrieved on 2009.,. 01-14] figures 8,9,16,18,19.

* cited by examiner

*Primary Examiner* — Robert Beausoliel, Jr.
*Assistant Examiner* — Hau H Hoang

(57) ABSTRACT

A method and apparatus for determining a list of members for a Group Push to Talk Session in a communications network. A Search Proxy function receives, from a requesting network node, a search request message. The search request message comprises at least one of an instruction to limit the maximum time for a search operation to take, an instruction to send search results in segmented blocks, an instruction to send search results in a predetermined format; and an instruction to perform a search according to a predetermined pattern. The Search Proxy function then performs a search for members with which to populate the list and sends the search results to a receiving node. In most cases, the receiving node is the requesting node.

11 Claims, 4 Drawing Sheets

METHOD AND APPARATUS FOR DETERMINING A LIST OF MEMBERS FOR A PUSH TO TALK COMMUNICATIONS SERVICE

TECHNICAL FIELD

The present invention relates to Push-to-Talk communications services.

BACKGROUND

Walkie-talkie type services are popular amongst users who wish to communicate brief messages quickly between one another. Walkie-talkie type services are sometimes known as Push-to-talk (PTT) services. Conventionally, such PTT services have been provided by two-way portable radios which utilise a dedicated part of the radio spectrum, but which only allow users to communicate with a small group of pre-selected users who utilise similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of PTT services, an industry grouping known as the Open Mobile Alliance (www.openmobilealliance.org) has been established with the aim of standardising suitable protocols which will allow inter-network operability for walkie-talkie services offered over cellular networks. The service established by the various standards is known as Push-to-talk Over cellular (PoC). PoC makes use of the IP Multimedia Subsystem (IMS) to handle the setting up and control of PoC sessions via PoC application servers (acting as SIP ASs). PoC proposes that associated speech data will be transported over a packet switched access technology. In the case of GSM and UMTS, this will be the General Packet Radio Service (GPRS) access technology. In other network architectures, analogous packet switched access technologies will be utilised for transporting talk data. Push to Talk services may also be offered over circuit switched access networks, although this is not the preferred option. The current state of PoC is set out in Release 1.0. The requirements for PoC Release 2 are under discussion. PoC Release 2 will extend PoC to include multimedia and not just speech, and also include a feature that makes it possible to dynamically establish PoC Sessions based on location, presence state and interest.

A Dynamic PoC Group Session can be populated with pre-defined Members, or populated by any user, equipped with a PoC capable device (referred to as a PoC Client) fulfilling the location, presence state and interest criteria. In some cases, a search operation is required in order to populate the PoC Group Session with members.

The Open Mobile Alliance has defined a Search Proxy to coordinate search operations (see OMA-AD-XDM-V2_0-20070724-C), since the search operation may require searches in several databases and in different domains.

In the event that a search operation is required, the PoC Server sends a search request to the Search Proxy. The search request includes required search criteria, and on receipt of the request, the Search Proxy coordinates searches in one or more databases (e.g. there may be more than one domain to search before a complete result can be returned). Once the search is complete, the Search Proxy sends the results of the search to the PoC Server. The results include URIs of PoC Users that meet the search criteria. The search results are then used by a function to evaluate and select PoC User(s) to invite to the Group Session.

If the search criteria are very broad, for example "look for everybody interested in football", the search may take very long time and/or return a lot of users fulfilling the search criteria, especially if the search is performed over several domains. This may create conflicts between limitations in the SIP protocol (e.g. running timers, etc) and the time it will take to perform the search.

The Search Proxy returns the search result in a single block once the search has been completed. The size of the block can be limited by specifying an optional "max-result" parameter. In this case, the Search Proxy searches until that amount is found or all databases have been searched without finding any users.

The existing technique for searching for members to invite to a Group Session is time-consuming, leading to conflicts with SIP requirements.

SUMMARY

The inventors have realised the problems associated with the prior art, and have devised a new search request for sending from a Push to Talk Server to a Search Proxy that refines the searching process and reduces delays between requesting the search results and obtaining the search results.

According to a first aspect of the invention, there is provided a method of determining a list of members for a Group Push to Talk Session in a communications network. A Search Proxy function receives from a requesting network node a search request message. The search request message comprises at least one of an instruction to limit a maximum time for the search operation to take, and an instruction to send the search results in segmented blocks. The Search Proxy function then performs a search for members with which to populate the list, and sends the search results to a receiving node. The use of a maximum time limits the time a search operation can take, making the sending of the search results quicker and enhancing a user's experience. Similarly, by sending the results in segments, rather than waiting for the search to be completed, the receiving node starts to receive search results sooner, enhancing the user's experience.

Optionally, the receiving node is the requesting network node, although it is possible for one node to request the search and another node to receive the search results.

As an option, where the instruction comprises an instruction to send the search results in segmented blocks, the instruction further comprises a maximum size of each segment to be sent.

Optionally, the requesting network node is a Push to Talk Over Cellular server. However, it is possible for other network nodes, such as Instant Messaging enablers, to request a search.

The requesting network node and the Search Proxy function are optionally located in an IP Multimedia Subsystem network, although the invention is suitable for use in other types of network that accommodate Push top Talk services.

The search request message optionally comprises an instruction to return search results according to a predetermined format. This reduces the time it takes for the receiving node to interpret the search results, as they can be returned in a format suitable for the receiving node.

The search request message optionally comprises an instruction to perform the search according to a predetermined pattern. In this way, some control can be exercised over which domains etc are searched first.

According to a second aspect of the invention, there is provided a method of determining a list of members for a Group Push to Talk Session in a communications network. A Search Proxy function receives from a requesting network node a search request message. The search request message comprises an instruction to send search results according to a predetermined format. A search is performed for members with which to populate the list, and the search results are sent to a receiving node in the instructed format. By sending the results in a format suitable for the receiving node, less processing power is required at the receiving node to interpret the results.

The method optionally comprises an instruction to send the search results in any one of a predetermined message protocol, and size. The instruction optionally comprises one of an instruction to include a random selection of found members in the search results and an instruction to include all found members in the search results. The instruction optionally further comprises an instruction to order found members in the search results according to any one of an alphabetical order, predetermined prioritized users or groups of users first, or an exclusion predetermined users or groups of users.

As an option, the search request message further comprises an instruction to perform the search according to a predetermined pattern, in order to allow the requesting node to exercise some control over which domains are searched first.

According to a third aspect of the invention, there is provided a method of determining a list of members for a Group Push to Talk Session in a communications network. A Search Proxy function receives from a requesting network node a search request message, the search request message comprising an instruction to perform the search according to a predetermined pattern. The Search Proxy function performs a search for members with which to populate the list according to the instruction, and sends the search results to a receiving network node. This is useful where, for example, the requesting node has some knowledge of which domains are likely to produce better search results. The instruction optionally comprises an order in which to search predetermined information sources.

According to a fourth aspect of the invention, there is provided a method of determining a list of members for a Group Push to Talk Session in a communications network. A Search Proxy function receives from a requesting network node a search request message. The search request message comprises at least one of an instruction to limit the maximum time for a search operation to take, an instruction to send search results in segmented blocks, an instruction to send search results in a predetermined format; and an instruction to perform a search according to a predetermined pattern. The Search Proxy function then performs a search for members with which to populate the list and sends the search results to a receiving node. These search parameters improve the efficiency of searching and handling the search results.

According to a fifth aspect of the invention, there is provided a Search Proxy for use in a communications network. The search proxy comprises a receiver for receiving from a requesting network node a search request message. The search request message comprises any of an instruction to limit a maximum time for a search operation to take, an instruction to send search results in segmented blocks, an instruction to send search results in a predetermined format; and an instruction to perform a search according to a predetermined pattern. The search proxy further comprises means for searching at least one database to find potential members for a Group Push to Talk Session, and a transmitter for sending a search result to a receiving node.

According to a sixth aspect of the invention, there is provided a network node for use in a communications network. The node comprises a transmitter for sending, to a Search Proxy function, a search request message. The search request message comprises any of an instruction to limit the maximum time for a search operation to take, an instruction to send search results in segmented blocks, an instruction to send search results in a predetermined format; and an instruction to perform a search according to a predetermined pattern. The network node further comprises a receiver for receiving a search response message from the Search Proxy function, the search results comprising a list of potential members for a Group Push to Talk Session. The network node further comprises means for populating a list of members on the basis of information contained in the search response message. These search parameters improve the efficiency of searching and handling the search results.

Optionally, the network node is a Push to Talk over Cellular Server.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

Figure 1:
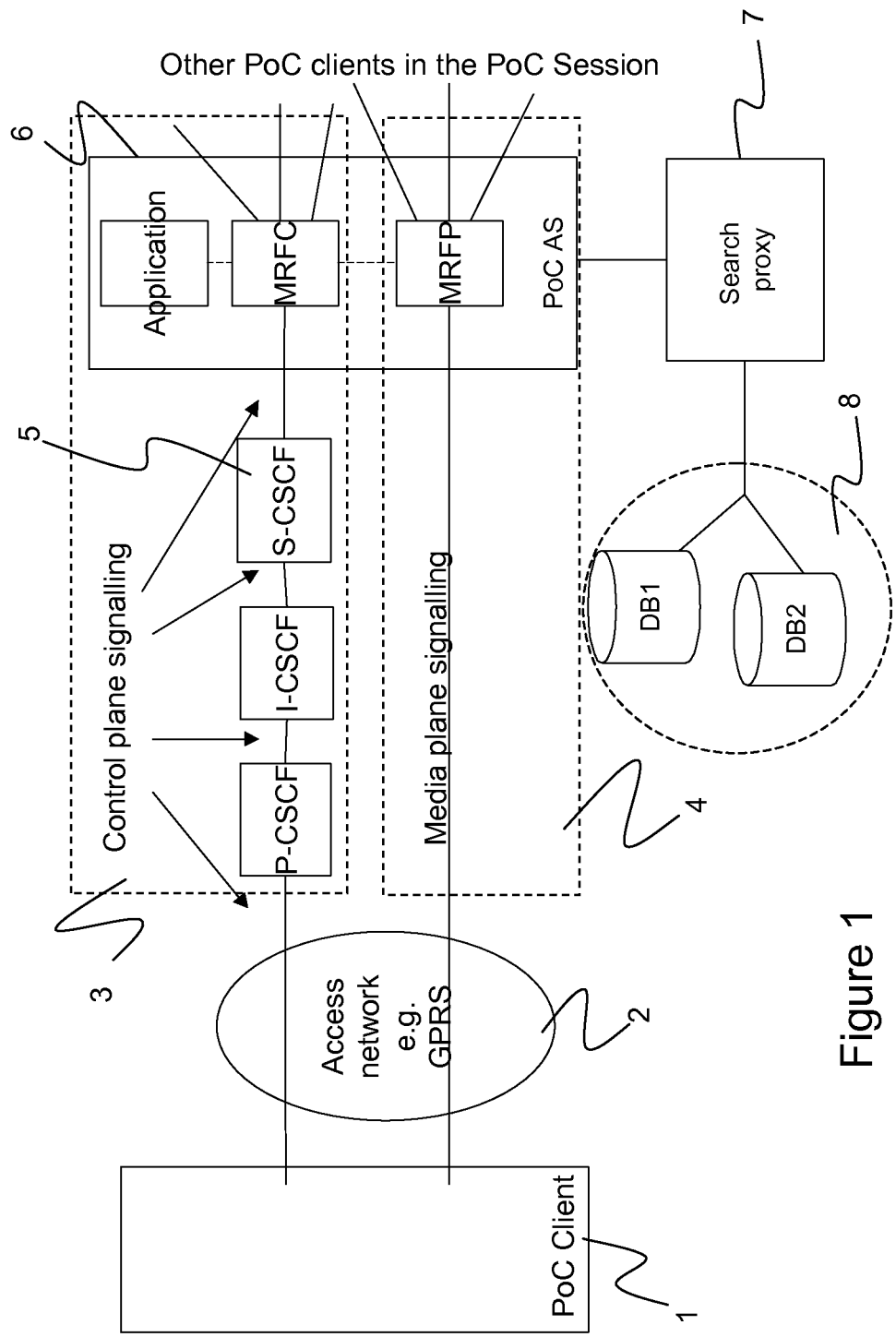
FIG. 1 illustrates schematically in a block diagram a system architecture according to an embodiment of the invention.

FIG. 1 illustrates schematically an IMS network comprising various network nodes, including application servers and SIP proxies. This architecture will be well known to those of skill in the art. For the purpose of this discussion it is sufficient to note that an IMS client 1, i.e. a user terminal, is attached to an access network 2 which is likely to be a cellular telephone network such as a GSM or 3G network. Via the access network 2, the IMS client 1 communicates with an IMS core network 3 and with a transport network 4. An IMS service session is established by the IMS client 1 exchanging SIP signalling with entities within the IMS core network 3 and with peer IMS clients. The IMS core network 3 is linked to the transport network 4, with the former making available resources within the transport network 4 for use by the IMS client 1 as required.

Considering further the IMS core network 3, the IMS client is allocated a Serving Call Session Control Function (S-CSCF) 5. The S-CSCF 5 is located within the home IMS domain of the subscriber using the IMS client 1, regardless of whether the client 1 accesses the IMS from within the home domain or via a "visited" domain. The CSCFs (including the S-CSCF 5) handle reachability, authentication and authorisation functions in respect of subscribers. Provision of services is handled by SIP Application Servers (ASs). FIG. 1 illustrates a PoC AS 6 which provides the service logic for the PoC service.

When a user wishes to establish a Group Session, and wishes to populate a list of members for the Group Session, the PoC AS 6 contacts a Search Proxy 7, which in turn contacts at least one database 8, and returns a list of potential group members to the PoC AS 6. The PoC AS can then select which members of the list to invite to the group session.

When the PoC AS 6 sends a search request to the Search Proxy 7, the PoC AS 6 includes in the request one or more of the following parameters:

A Search Timer indicating the maximum time the search operation is allowed to take before the Search Proxy must return a result;
 A Max result value. The Max result value can be limited by setting a <max-participant-count> element in the Group document, making it possible to limit the number of returned URIs to a reasonable value;
 One or more search patterns. Search patterns are used to target domains, the search order for searching different target domains, users, groups and other search sources;
 A Search Response instruction that requests that the search results are returned having a certain size or structure; and
 A request for Segmented Results, making it possible for the PoC AS 6 to receive parts of the result before the search operation is completed. This may further include an instruction limiting the size of each segment.

Once the Search Proxy 6 has received the search results, it begins the search process taking the Search Timer, the existing Max-result, Search Pattern, Segmented Result and/or Search response into account.

Possible search results include:

1. Positive response: A list of URIs is returned and the search is completed (HTTP 200 OK response).
 2. Positive response: A list of URIs is returned and the search operation continues as a result of a request for response segmentation (HTTP 200 OK response).
 3. Negative response: No PoC User fulfilling the search criteria is found (HTTP 404 Not Found response).
 4. Negative response: search timer expires (HTTP 404 Not Found response).
 5. Negative response: search request is in conflict with the network e.g. when search tree or domain is not recognized, or search expression is not allowed (e.g. HTTP 409 Conflict response).

The Search Timer, Max-result, Search Pattern, Search response and/or Segmented Result can be either defined in a Group document for the Dynamic Group in a Shared Group XDMS or as system configuration parameter in the PoC Server, or a combination of both. A Shared Group XDMS is a database for storing Group documents to provide multiple services access to Group documents, and Group documents include rules for a particular group. A Group document may contain Dynamic Group rules for more than one service. Dynamic PoC Groups documents include rules for Dynamic PoC Groups. Rules are syntactically organised according to XML schema(s). Each document has at least one schema. The word rules is used herein to refer to parameters that apply to all members and for all services using the Group, and may consist of, for example, parameters valid only for a specific service, or a specific user.

The search timer may be derived from SIP protocol timers, the Group document or configuration in the PoC Server, and provides a limit on the maximum time that the search can take.

It is possible to use parameter "max-participant-count", defined as an element in the Dynamic Group document, (as specified in OMA spec "Shared Group XDM Specification", Version 1.0, Open Mobile Alliance™) and/or as a system configuration parameter, as an input for setting the value of existing parameter "max-result".

Search patterns can be defined by setting, for example, a Domain Search Order. Listing domains in a certain order can be used to specify search order. Furthermore, a search pattern can be defined by setting a search order between static data (stored in XDMSs) and dynamic data (Service Enabler).

The Search response can be influenced by setting any of the following attributes:

Search Type: Values are selected from one of "Random" (the users are randomly selected), "All" (all users are returned, max-result not used), and "Ordered". Where the results are Ordered, examples of values are:
  1. A-first (default). A-first is according alphabetical order on for example first name, last name, interest profile data.
  2. Not included users, groups, lists or profile data. For example user id (SIP URI), first name, last name, interest profile data.
  3. Prioritized users first. For example user id (SIP URI), first name, last name, interest profile data.

In order to reduce delays, the PoC Server may request the result to be segmented rather than sent in a complete block. A segmented sequence of response requires either a session based search with session ID and repeated HTTP/POST requests with the unique session ID (ID is defined by the PoC Server), or can be done using a single HTTP/POST request requesting the Search Proxy to transfer the result in segments where the max number of Users transferred in each segment is according to a parameter set by the PoC Server.

Note that most of the search parameters described above are not mutually exclusive, so, for example, a search request may instruct a maximum time in addition to a request for segmented results and a request to send the results in a particular format with prioritized user first, arranged alphabetically.

Figure 2:
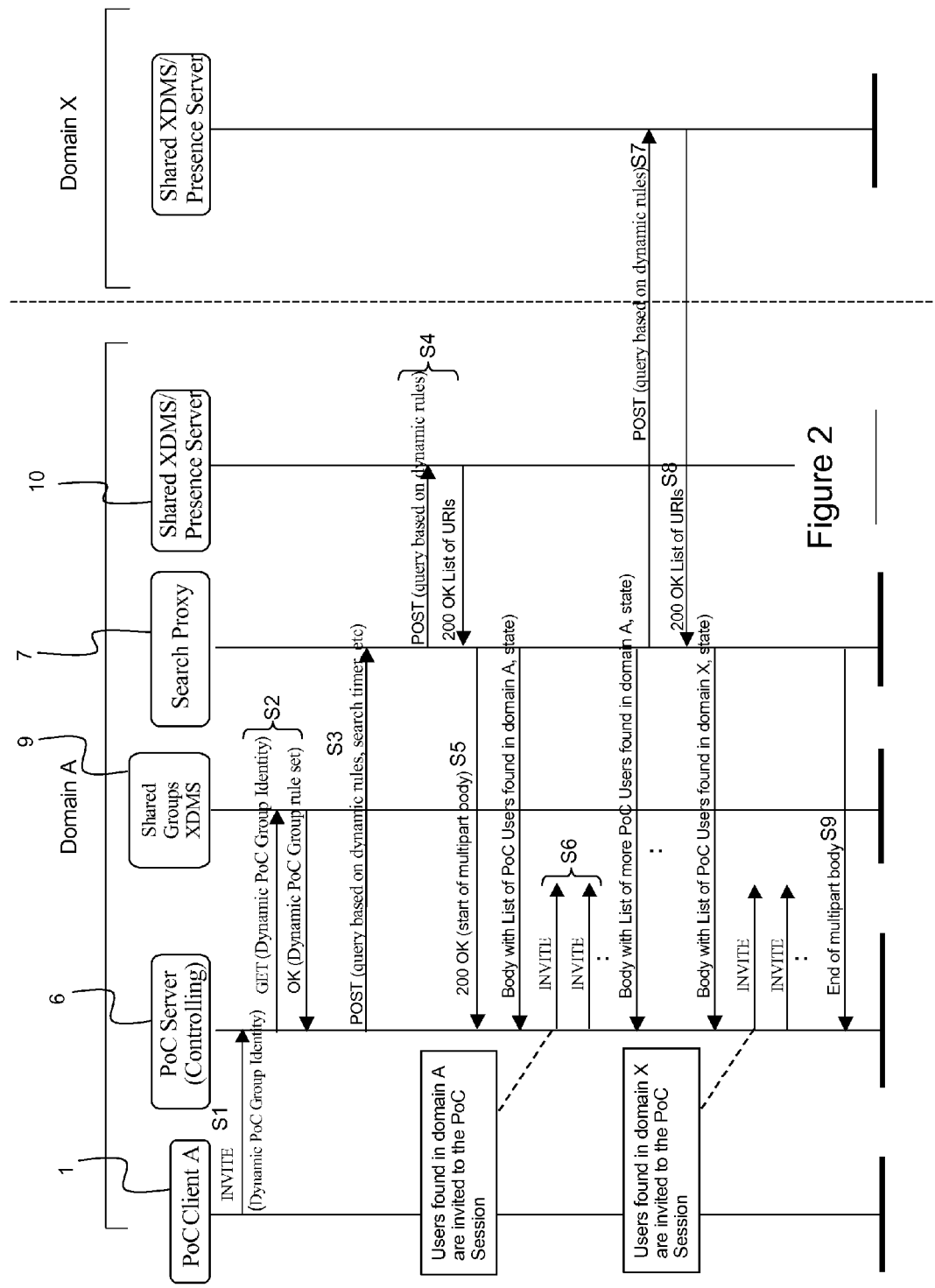
FIG. 2 illustrates schematically in a block diagram a signalling sequence to find Users to invite to a Push to Talk Group Session according to an embodiment of the invention.

An example of a signalling sequence for requesting a search by a Search Proxy is illustrated schematically in FIG. 2. In this example, the pre-arranged PoC Group includes only dynamic criteria for PoC Users to be invited.

The steps of the flow are as follows:

S1. The PoC Client 1 initiates a Pre-arranged PoC Group Session by sending a SIP INVITE request to the PoC Server 6.

S2. The Pre-arranged PoC Group document is fetched by the PoC Server from the Shared Group XDMS 9.

S3. The PoC Server detects that there is a need to perform a search using the Search Proxy. The PoC Server 6 includes Search Timer, Max-results, Search Pattern, Search Response and Segmented result and sends a HTTP POST request to the Search Proxy 7.

S4. The Search Proxy 7 starts the search in a Shared XDMS/Presence Server 10 of the Domain A. The Search proxy 7 supervises the time it takes to do the search, and the number of results received, based on the Search Timer and Max-results received in the HTTP POST request from the PoC Server 6.

S5. When the search has resulted in Users found in the Domain A, and if there is still time to do more searches, and if Max-results is not yet exceeded, the Search Proxy 7 returns the results so far to the PoC Server 6 in a HTTP 200 OK response. The response includes the results and the state of the search operation e.g. elapsed time. If the search was requested with a segmented result, the response is followed by a list of Users in a sequence of messages.

S6. The PoC Server invites the PoC Users in the list received in the HTTP 200 OK response and its subsequent messages as they are received.

S7. The Search Proxy continues the search, now in domain X, based on the information received in the HTTP POST request.

S8. When the search is complete, the results are returned to the PoC Server 6 and PoC Users found in the Domain X are invited to the Group Session. If the search was requested with segmented results, bodies with a list of Users found in Domain X are returned in a sequence of messages, and the PoC Server 6 invites found PoC Users in the same way as described above.

S9. When there are no more results to return, the Search Proxy 7 sends a message with end indication to the PoC Server.

Note that the PoC Server 6 may need to perform the search several times during a PoC Session in order to re-evaluate the Dynamic rules.

Figure 3:
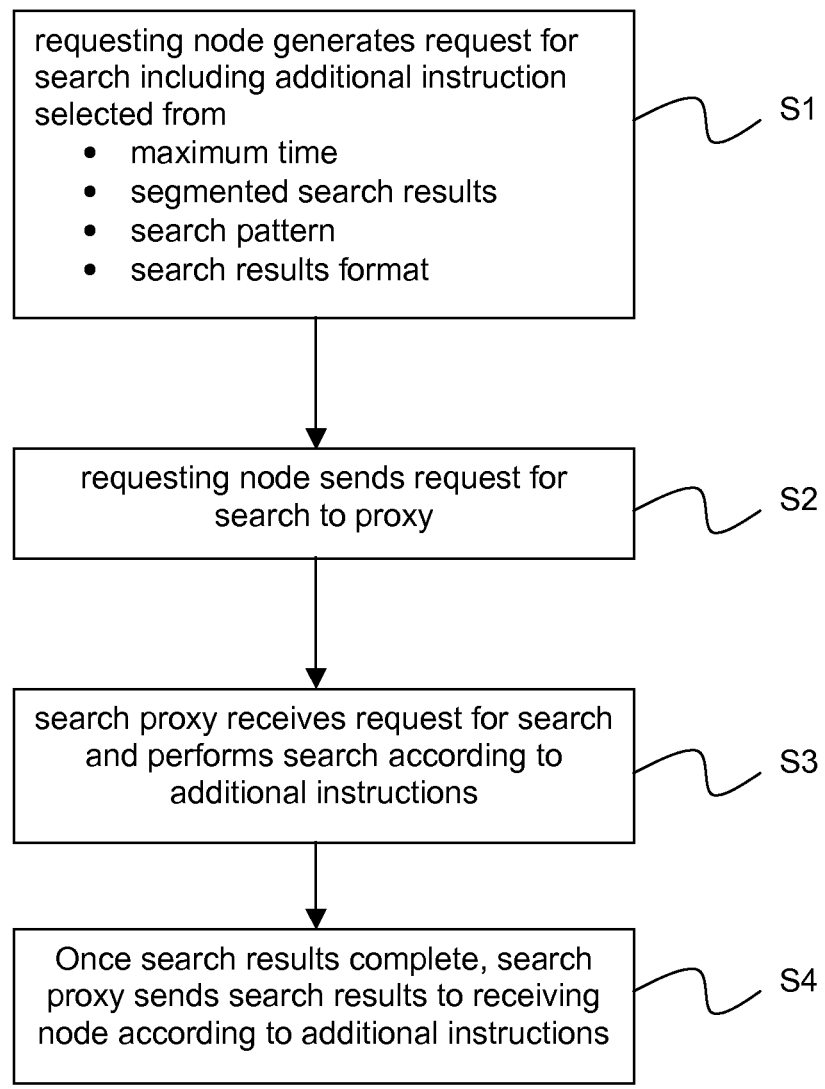
FIG. 3 is a flow diagram illustrating the steps according to an embodiment of the invention.

FIG. 3 herein is a flow diagram illustrating the steps according to an embodiment of the invention. The following numbering refers to the numbering of FIG. 3:

S1. The requesting node generates a request for search. The search includes at least one additional instruction, selected from a maximum time for the search to take, and instruction to send the search results in segments, an instruction to send the search results in a particular format, and an instruction to search in a predetermined pattern, as described above;

S2. The requesting node sends the search request to the search proxy;

S3. On receiving the search request, the search proxy performs the search according to the additional instructions;

S4 Once the search is complete, the search proxy sends the search results to a receiving node (in most cases the receiving node is the requesting node) according to the instructions.

Figure 4:
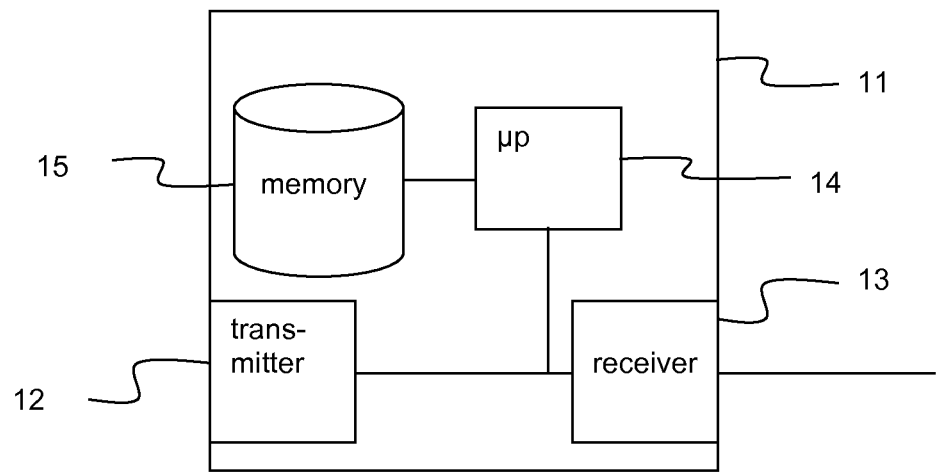
FIG. 4 illustrates schematically in a block diagram a Push to Talk Server according to an embodiment of the invention.

Referring to FIG. 4 herein, there is illustrated a Push to Talk Server 11, such as a PoC Server. The Server comprises a transmitter 12 for sending the search request to the search Proxy, and a receiver 13 for receiving a search response message from the Search Proxy function. The Server also comprises a processor 14 for generating the search request message and for populating a list of members on the basis of information contained in the search response message. The Server may comprise a memory 15 for storing the results contained in the search response message.

Figure 5:
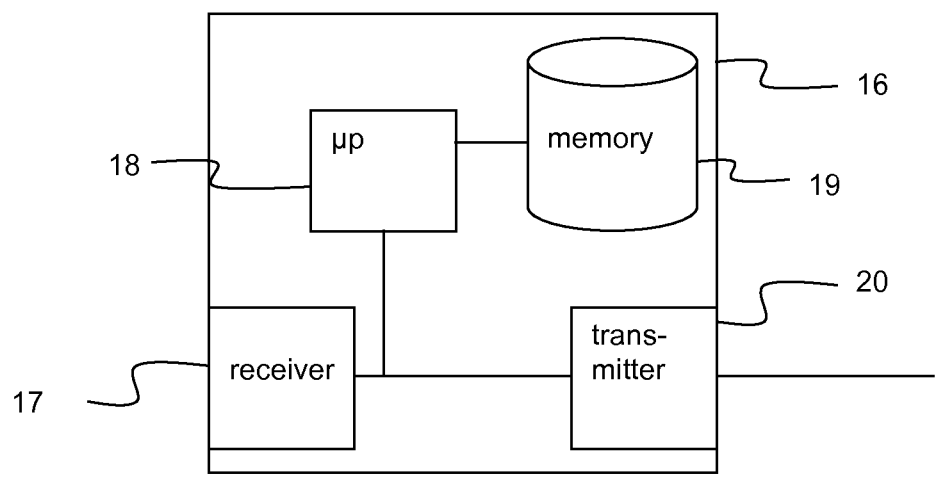
FIG. 5 illustrates schematically in a block diagram a Search Proxy according to an embodiment of the invention.

Referring to FIG. 5 herein, there is illustrated a Search Proxy 16. The Search Proxy comprises a receiver 17 for receiving a search request message from a Push to Talk Server. A processor 18 is provided for performing the search in the basis of instructions contained within the search request message. A memory 19 may be provided for storing or caching the results of searches, and a transmitter 20 is provided for returning a search response to the Push to Talk Server.

The invention as described above allows the PoC Server to control the search operation, keeping the search time below SIP protocol timers. Furthermore, it enables the Group document to control the search operation. The PoC User can control the results of a search operation by, for example, setting the search rules in the Group document, if the user is authorized to do so. Currently, a user must be the owner of the document in order to set the search rules, although it is envisaged that there may be circumstances where it would be desirable for a non-owner of the document to be allowed to set the search rules. A search operation may be limited to predefined domains, and it is possible to initiate establishment of a PoC Session without waiting for the search operation to be completed.

Although various embodiments have been shown and described in detail, the claims are not limited to any particular embodiment or example. None of the above description should be read as implying that any particular element, step, or function is essential such that it must be included in the claims' scope. For example, the above description describes a scenario in which the originator of the search request is the PoC Server. However, other service specific servers may also use the search parameters according to the invention. For example, an Instant Messaging (IM) enabler server may make use of the invention to populate a group of members to whom a message should be send. A converged IP Messaging enabler server may make a similar use of the invention.

The following acronyms are used in this specification:
AS Application Server
IMS IP Multimedia Subsystem
OMA Open Mobile Alliance
PoC Push To Talk Over Cellular
PTT Push to Talk
SIP Session Initiation Protocol
URI Uniform Resource Identifiers
XDM XML Data Management

The invention claimed is:

1. A method of determining a list of members for a Group Push to Talk Session in a communications network that uses a Session Initiation Protocol, the method comprising:
    at a Search Proxy function, receiving from a requesting network node a search request message, the search request message comprising at least four instructions, the instructions comprising:
        an instruction to limit a maximum time for a search operation;
        an instruction to send search results in segmented blocks;
        an instruction to return the search results according to a predetermined format, such that found members are ordered in the search results according to any one of alphabetical order, predetermined prioritized users or groups of users, and an exclusion predetermined users or groups of users; and
        an instruction to perform the search according to a predetermined pattern;
    performing a search for members with which to populate the list according to the at least four instructions included in the search request message; and
    sending the search results, from each domain that is searched, in segmented blocks to a receiving node before the maximum time at the search proxy function expires.

2. The method according to claim 1, wherein the receiving node is the requesting network node.

3. The method according to claim 1, wherein the instruction to send the search results in segmented blocks comprises a maximum size of each segmented block to be sent.

4. The method according to claim 1, wherein the requesting network node is a Push to Talk over Cellular server.

5. The method according to claim 1, wherein the requesting network node and the Search Proxy function are located in an IP Multimedia Subsystem network.

6. The method according to claim 1, wherein the instruction further comprises an instruction to send the search results in any one of a predetermined message protocol and size.

7. The method according to claim 1, wherein the search request message further comprises one of an instruction to include a random selection of found members in the search results and an instruction to include all found members in the search results.

8. The method according to claim 1, wherein the predetermined pattern comprises an order in which to search predetermined information sources.

9. A Search Proxy for use in a communications network that uses a Session Initiation Protocol, the search proxy comprising:
- a receiver for receiving from a requesting network node a search request message, the search request message comprising at least four instructions, the instructions comprising:
  - an instruction to limit a maximum time for a search operation,
  - an instruction to send search results in segmented blocks,
  - an instruction to send search results in a predetermined format, such that found members are ordered in the search results according to any one of alphabetical order, predetermined prioritized users or groups of users, and an exclusion predetermined users or groups of users; and
  - an instruction to perform a search according to a predetermined pattern;
- a processor for searching at least one database to find potential members for a Group Push to Talk Session according to the at least four instructions included in the search request message; and
- a transmitter for sending the search results, from each domain that is searched, in segmented blocks to a receiving node before the maximum time at the search proxy function expires.

10. A network node for use in a communications network that uses a Session Initiation Protocol, the node comprising:
- a transmitter for sending, to a Search Proxy function, a search request message, the search request message comprising at least four instructions, the instructions comprising:
  - an instruction to limit a maximum time for a search operation;
  - an instruction to send search results in segmented blocks;
  - an instruction to return the search results according to a predetermined format, such that found members are ordered in the search results according to any one of alphabetical order, predetermined prioritized users or groups of users, and an exclusion predetermined users or groups of users; and
  - an instruction to perform the search according to a predetermined pattern;
- a receiver for receiving, before the maximum time at the search proxy function expires, a search response message from the Search Proxy function comprising search results with a list of potential members for a Group Push to Talk Session; and
- a processor for populating a list of members on the basis of information contained in the search response message.

11. The network node according to claim 10, wherein the network node is a Push to Talk over Cellular Server.

* * * * *